United States Patent
Brasen et al.

(10) Patent No.: US 7,130,057 B2
(45) Date of Patent: Oct. 31, 2006

(54) METHOD AND APPARATUS FOR CONTROLLING THE POSITION OF A PROBE LOCATION RELATIVE TO A FIXED REFERENCE POINT OF A PROBE PROCESSING EQUIPMENT

(75) Inventors: Gernot Brasen, Mainz (DE); Matthais Loeffler, Eisenberg (DE); Heiko Theuer, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 10/725,261

(22) Filed: Dec. 1, 2003

(65) Prior Publication Data

US 2004/0119983 A1 Jun. 24, 2004

(30) Foreign Application Priority Data

Dec. 20, 2002 (EP) .................................. 02102860

(51) Int. Cl.
*G01B 11/02* (2006.01)
(52) U.S. Cl. ........................ 356/501; 356/493
(58) Field of Classification Search ................ 356/487, 356/492, 493, 496, 498, 501, 500
See application file for complete search history.

(56) References Cited

U.S. PATENT DOCUMENTS 3,601,490 A * 8/1971 Erickson ................... 356/493

FOREIGN PATENT DOCUMENTS

JP 09113217 A * 5/1997
JP 410090591 A * 4/1998

* cited by examiner

*Primary Examiner*—Hwa (Andrew) Lee
*Assistant Examiner*—Patrick Connolly
(74) *Attorney, Agent, or Firm*—Dillon & Yudell LLP

(57) ABSTRACT

A method for controlling the position of a probe location relative to a fixed reference point of a probe processing apparatus is described. Initially, an optical laser apparatus is coupled to the probe processing apparatus. The position of the probe location is set to fall within a predetermined converging range of a positioning laser beam coming from the optical laser apparatus. The positioning laser beam is then split into a probe beam and a reference beam. The probe beam and the reference beam are polarized in different directions with respect to each other. The reference beam is subsequently combined with a reflected beam formed by the probe beam reflected from the probe location. The phase difference between the reference beam and the reflected beam is detected, and a table on the probe processing apparatus for supporting the probe is adjusted to minimize the detected phase difference.

14 Claims, 3 Drawing Sheets

METHOD AND APPARATUS FOR CONTROLLING THE POSITION OF A PROBE LOCATION RELATIVE TO A FIXED REFERENCE POINT OF A PROBE PROCESSING EQUIPMENT

CROSS REFERENCE TO RELATED APPLICATIONS

This application claims priority to an application entitled "High Accuracy Laser Fine Autofocus System" filed in the Patent Office in Germany on Dec. 20, 2002, and assigned Application No. 02102860.0, the contents of which are hereby incorporated by reference.

BACKGROUND OF THE INVENTION

1. Technical Field

The present invention relates to the field of optical probe surface inspection by interferometry, and in particular to a method and apparatus for fine-controlling the position of a predetermined probe location relative to a fixed reference point of a probe processing apparatus fixedly coupled to an auxiliary optical laser apparatus in which method the position is controlled with optical means.

2. Description of the Related Art

One prior art system is disclosed in U.S. Pat. No. 5,469,259 to IBM Corporation, Armonk, USA. In the disclosed system a surface profile interferometer is used as a device for determining the roughness of a surface or the height of a step change in the thickness of a part being measured. Such a step change may be caused, for example, by the application of a metal film to a substrate in the manufacture of a printed circuit board or an integrated microcircuit. In general terms, an interferometer is an optical instrument in which two beams of light derived from the same monochromatic source are directed along optical paths of different length, in which the difference in length determines the nature of an interference pattern produced when the light beams are allowed to interfere. Since the beams of light are derived from the same monochromatic source, they are identical in wavelength. At equal path distances from the source, they are also in phase with one another. Phase differences between the beams therefore result only from differences in path length.

The phenomenon of light wave interference results from the mutual effect of two or more waves passing through the same region at the same time, producing reinforcement at some points and neutralization at other points, according to the principle of superposition.

With a photoelectric shearing interferometer, the height of a step change in a test surface may be measured using polarized light passed through a slit, through a Wollaston prism, and through a microscope objective lens, to form two images of the slit, with one image on each side of the step change. The beams reflected by the test surface pass through the lens and the prism, with an image being formed by two orthogonally polarized beams. The phase difference between these beams, which is determined by the height of the step, may be measured by the linear movement of a weak lens in a lateral direction (transverse to the beam) until the phase difference is exactly cancelled, as determined by the use of an electro-optic modulator, an analyzer, a photomultiplier, and a phase-sensitive detector, which are used together to detect the phase equality of the two interfering beams. The accuracy of the system depends on the precision to which the linear movement of the weak lens can be measured.

In the above-referenced United States patent, a separate autofocus system is required for maintaining the focus of the main imaging path of the interferometer. This is done by a separate arrangement according to confocal technique, i.e. to control the intensity of a target spot and maintaining the intensity at the maximum level. A disadvantage is that too many optical elements are used which makes the autofocus system difficult to adjust and renders it error-prone.

It is thus an objective of the present invention to provide a method and respective system for positioning a predetermined probe location in an automated way and avoiding the disadvantages of confocal autofocus systems.

SUMMARY OF THE INVENTION

According to the broadest aspect of this present invention a method is disclosed for fine-controlling the position of a predetermined probe location relative to a fixed reference point of a probe processing apparatus, which is understood to be the actual device which benefits from the inventive fine-control, e.g., a laser microscope, a common optical microscope, a laser scan apparatus, a read/write laser in a consumer electronic device, like a CD-player, a DVD player, an optical storage device, etc., whereby said probe processing apparatus is fixedly coupled to an auxiliary optical laser apparatus, whereby the position is controlled with an optical device.

The present method is characterized by the steps of presetting the probe location position within a predetermined converging range of ¼ of the wave length of the applied fine-controlling positioning laser beam and thereafter splitting the positioning laser beam having a linear polarity into a probe beam (S2) and a reference beam (S1), whereby a respective optical beam splitting means represents the fixed reference point. Next, the probe beam and the reference beam are polarized in different directions, preferably perpendicular to each other. A beam reflected from the probe location is then recombined with the reference beam. Next, a phase difference between the reflected beam and the reference beam is detached and a table supporting the probe is then controlled, such that the detected phase difference is minimum.

The table may be advantageously piezo-driven, as it is known in prior art. The main advantage of this basic inventive method is that the inventive system is built without lenses, and that a simple setup could be used, as it will be later described with reference to FIG. 1.

Further, when the above mentioned method steps are repeated continuously for a plurality of probe locations while scanning a continuous portion of a probe surface, the inventive principle can also be used for scanning large scale surfaces, as they occur in diverse industries, as e.g. chip surfaces.

Additionally, the said auxiliary optical laser apparatus may be advantageously used to perform a fine-controlled auto-focusing of a process laser beam. Then, the respective process laser beam is associated with said probe processing apparatus. Multiple examples exist, in which the present invention may be applied: A Laser (Scan) microscope, a laser system used or abrasive purposes, for reading data from a storage media (CD, DVD, Magneto-optical disk, etc.), and finally any mechanical tool having a kind of small tip which interacts in a particular dedicated way with a respective surface of a probe, for example an Atomic Force Microscope, a mechanically operating profiler touching and scanning a probe surface, etc.

In a particular example of use the present method can be used to perform a fine-focusing of a microscope apparatus acting as said probe processing apparatus. By that the accuracy of a prior art microscope focusing method can be improved by a factor of approximately 100, as a focus can be set with an accuracy of about 1 nanometer, depending on the electronic control device of the applied auto focus system.

An apparatus having means for performing the above-mentioned steps is disclosed, and a preferred example is described in more detail with reference to FIG. 1. Preferably, the means for performing selected steps present method is a polarizing beam splitter. Such an apparatus is easier to adjust, and less optical elements are used. Further, advantageously, the means for detecting said phase difference comprises either a quarter-wave-plate or a Babinet-Soleil-Compensator modifying the polarity of said recombined beam with a polarizing beam splitter (ST4) post-connected thereto and a pair of photo detection means, e.g., photo diodes sensing the respective intensity of the split beams for control purposes.

BRIEF DESCRIPTION OF THE DRAWINGS

The novel features believed to be characteristic of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
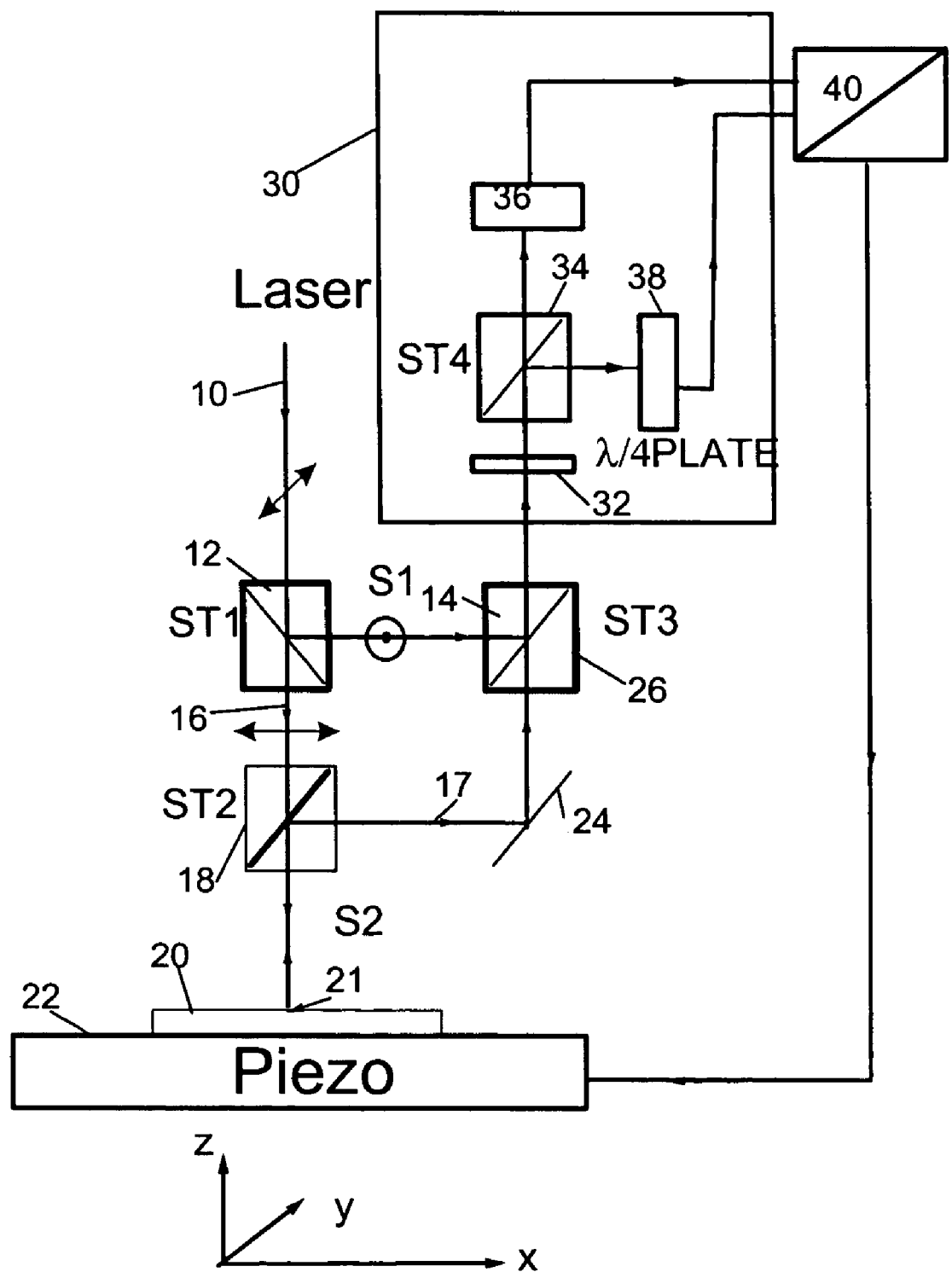
FIG. 1 is a block diagram representing a preferred embodiment of the apparatus used in the inventive method, in which the inventive auxiliary optical laser apparatus is shown, and an actual probe processing apparatus is suppressed for sake of clarity.
Figure 2:
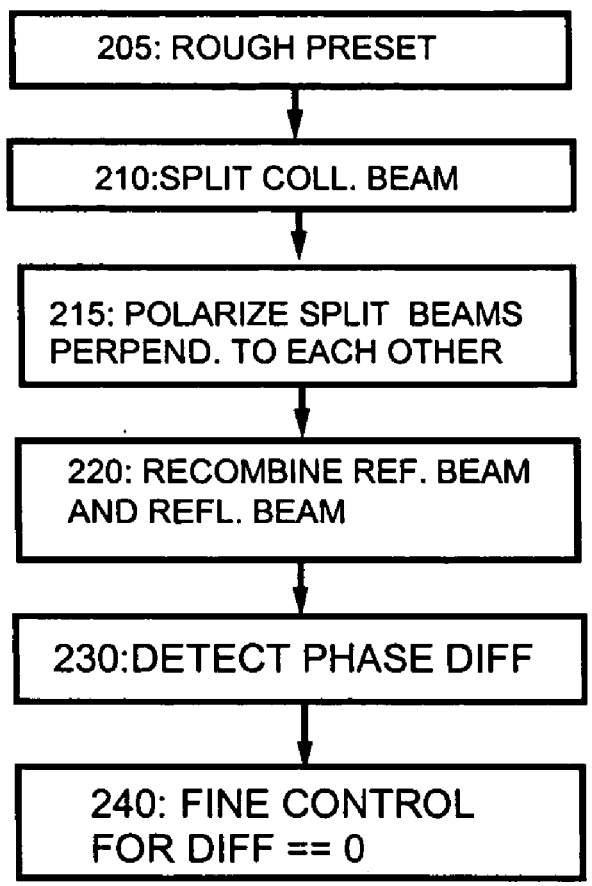
FIG. 2 is a block diagram representation illustrating the basic steps of the inventive method.

With reference to the figures and with special reference now to FIG. 1 and FIG. 2, after a rough preset—step 205 of the auxiliary laser system, a collimated laser input-beam, for example a Helium-Neon laser, which is linear polarized—or any other linear polarized laser system—is denoted with reference numeral 10. The input-laser beam impinges onto a polarizing beam splitter, abbreviated as ST1 in the drawing and having reference numeral 12. The incoming beam splits up—step 210—into a reference beam S1—reference numeral 14, having a polarity normal to the paper plane of FIG. 1, and into a transmissive beam S2—reference numeral 16, having a polarity-direction along the X-axis within the paper plane in FIG. 1—step 215.

The reference beam S1 is denoted with reference numeral 14, whereas the beam passing through beam splitter 12 is further referred to herein as "probe beam", having reference numeral 16. The probe beam is further transmitted through a second beam splitter 18, denoted as ST2, and is reflected from a predetermined probe location of probe 20, which is in turn supported by a piezo-driven support-table 22. The reflected beam 17 is reflected at beam splitter 18 to a redirecting mirror 24 and enters into a further beam splitter, denoted as ST3, having reference numeral 26. In said beam splitter 26 the reflected beam 17 is recombined with the reference beam 14, denoted as S1, step 220.

Thereafter the recombined beam enters an arrangement for detecting—step 230—a phase difference between said reflected beam and said reference beam, which is denoted by reference numeral 30 and encircled by a rectangle in broken lines.

In more detail the recombined beam first enters a commercially available quarter-wave-plate 32, which modifies the polarization of the combined laser beam for evaluation purposes. After transmission through said quarter-wave-plate 32, the combined beam enters into a further beam splitter 34 having again polarizing properties (like beam splitter ST1, 12). Beam splitter 34 splits up the combined beam into two different beams which are perpendicularly polarized to each other, the intensity of which is sensed in photo detectors 36 and 38, respectively.

The intensity values measured by photo detectors 36 and 38 which may advantageously be implemented as photo diodes, are further processed in a control-algorithm 40 which performs the inventionally provided fine-control 240 of the Z-position (top/down of the piezo-driven support-table 22) according to a given control aim, for example the difference signal value shall be minimum.

When the probe location, which optically reflects the probe beam 16, is moved in top- or down-direction (Z-direction) by the control 40, the phase difference between the probe-reflected beam 17 and the reference beam 14 is modified, respectively. Three scenarios, of which all can be advantageously evaluated according the present invention, are given next in order to illustrate the ranges, in which the phase differences and thus the polarization of the combined beam may vary. A respective difference-signal may for example be defined as: amplitude of photo-diode signal 36 minus amplitude of photo-diode signal 38:

(A) If the phase difference between reference beam and reflected beam is an integer multiple of the half of the laser-wave-length, then, the recombined laser beam entering the quarter-wave-plate 32 is again linear polarized. In this case, the quarter-wave-plate 32 moves the polarization of the laser beam from linear to circular. The circularly polarized beam is split by beam splitter 34 in equal intensities and thus, the intensities sensed by the photo-diodes 36 and 38 are equal. Thus, after a respective amplification of the difference-signal the control algorithm 40 is fed by a control signal with a minimum value, for example normalized to zero. In this case no control will be necessary, as the probe location, reflecting beam 17 is in the desired exact Z-position.

(B) If the phase difference is maximum, i.e. +90° or −90°, then the combined laser beam entering into quarter-wave-plate 32 as a respective, circular (right or left) polarity, which is modified by polarizing beam splitter 34 into a linear polarity, which results in a maximum intensity at either of the photo-diodes 36 or 38 with a respective minimum-value at the respective other photo-diode. Then the difference-signal which is used by the control-algorithm 40 is maximum, whereby the sign of the difference-signal is used in order to determine the moving-direction, in which the piezo-table will be moved in order to achieve the control-aim, i.e. a phase difference of zero.

(C) If the polarity of the combined beam is in general elliptic orientated, the polarity will not be changed after passing the quarter-wave-plate 32. Only the orientation of the elliptic polarity will be changed. In this general case the photo-diodes 36 and 38 send in most cases different intensities, resulting in a difference control signal, which is used in control algorithm 40 to move the support-table 22 in the correct direction, indicated by the sign of the difference-signal.

It should be noted that prior to perform a computerized control as described above the signal which is subjected to the control-algorithm must be calibrated in order to achieve a coincidence between a minimum difference-signal and the desired probe location.

When for example, the desired probe location is the center of a focal volume of a CD-laser beam, the calibration procedure comprises to set the optical arrangement given in FIG. 1 such that the difference-signal is minimum in that desired position. This can for example be done by setting the polarization-angle with reference to the beam of the above-mentioned quarter-wave-plate. Further, the piezo-driven probe-support-table 22 may be wobbled accompanied by a manual oscilloscope-control of the resulting error-signal, in order to obtain a good calibration.

It should be added, that the optical elements mentioned in here as polarizing beam splitters 12 and 34, respectively, may also be modified by replacing them by a non-polarizing beam splitter followed by a respective polarizing element, such as a foil or a crystal. Further, instead of said polarizing beam splitters it is also possible to apply polarizing prism devices, like Wollaston-Prism or Glan Thomson-device. Further, instead of applying a quarter-wave-plate 34 a Babinet-Soleil-Compensator can be applied, as well.

Figure 3:
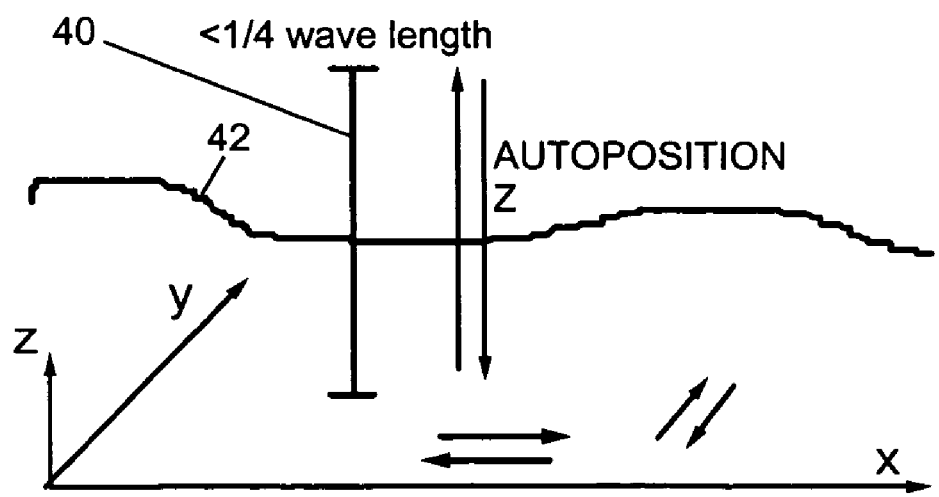
FIG. 3 is a schematic physical view representation primarily illustrating the relation ship in size of a probe surface and the presetting range in an inventional apparatus.

With further reference to FIG. 3 a further preferred application of the basic principle of the present invention is described in more detail. The line 42 is intended to illustrate a cross section of a probe surface with the depicted X-Z-plane, in which a laser scan apparatus is continuously moved while its processing laser beam focus is maintained at the desired location directly at the probe surface with the aid of the inventional principle. Thus, in this example the laser scan apparatus is the so-called probe processing apparatus according to the wording in the claims. The fine-controlled positioning laser beam, which is denoted with reference numeral 16 in FIG. 1, however, is used within an auxiliary optical laser apparatus fixedly coupled to the before-mentioned probe processing apparatus.

In order to achieve that both, the processing beam—not shown—and the positioning beam 16 may be directed very close to each other focused at a small spot at the probe surface 42. It is obvious for a person skilled in the art, that the auxiliary optical laser apparatus and the actual probe processing apparatus must be fixedly and stiff coupled together in order to achieve that any movement resulting from the control described above with reference to FIG. 1 results in a respective movement of the probe at basically the same location relative to the actual processing laser beam.

In FIG. 3 the converging range 40 is illustrated in relation to the roughness of the probe surface in order to illustrate the relationship between them two. The converging range 40 must be smaller than a quarter of the wavelength of the positioning laser beam. In case the wavelength is 800 nanometres, the range 40 is thus 200 nanometres. Thus, after the before-mentioned rough pre-setting 205 of the probe laser beam has been performed, the probe surface which is desired to be in the focus of the processing beam lies within the converging range. Thus, as a person skilled in the art will appreciate, a continuous movement in X-direction or Y-direction may be performed between the probe surface and the above-mentioned two fixedly coupled apparatuses in order to perform a laser scan procedure according to prior art. The advantage results that a very fine-controlled autofocus system is provided by the present invention. The fine control is achieved in the range of a about 1 nanometer.

A further preferred application of the inventive principle comprises to perform a fine control in the focusing procedure of a microscope. Prior art high quality microscopes have a focusing accuracy, which is about some 100 nanometers only. By virtue of the invention the auxiliary optical laser apparatus described above with reference to FIG. 1 may be fixedly coupled to the microscope and the optical focus of the objective may be fine controlled according to the above description. In this example the calibration procedure must be adapted in order to reflect the very best focus setting at a predetermined probe location. This calibration procedure, however, must be performed only once supposed the probe surface has no vertical steps larger than the converging range depicted in FIG. 3.

Figure 4:
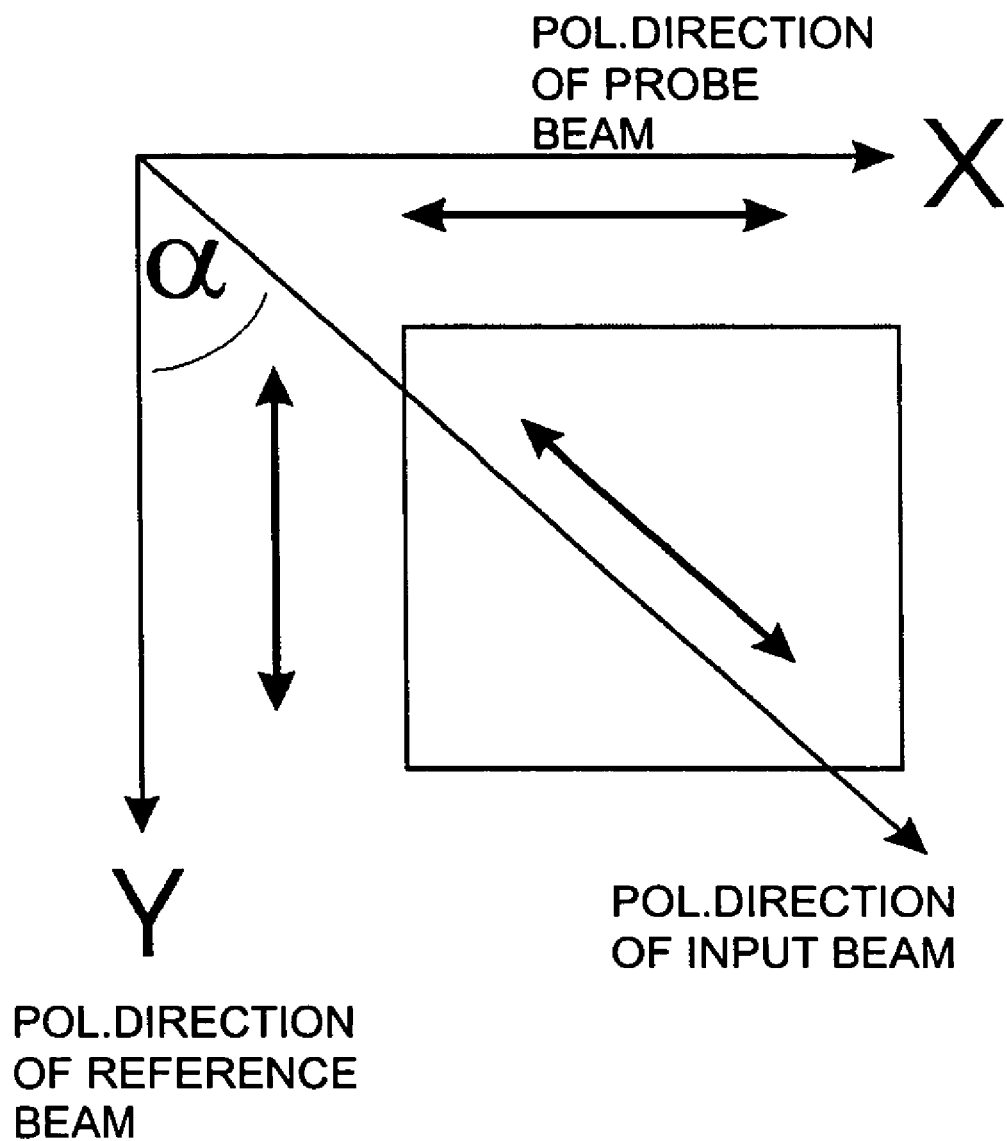
FIG. 4 is a schematic representation primarily illustrating the selection of the polarization direction of the incoming laser beam relative to that of the split beams.

With additional reference to FIG. 4 the polarization direction of the incoming laser beam 10 relative to that of the split beams X and Y, respectively, is illustrated. The angle α between the polarization direction of the input-beam and the polarization direction of the split beams 14, 16, respectively, must be different from zero and 90° and is preferred 45° (decimal degree). When it is 45°, the intensity of the split beams 14, 16 is equal. When using other angles than 45°, the intensity of the split beams 14, 16 varies as a function of the angle α. Polarization directions are also indicated in the drawing of FIG. 1 by respective arrows and usual symbols.

Further, according to a further advantageous aspect of the present invention the above angle α can also be set or controlled differently, in order to render the control easy by including the extent of the reflectivity of the focused probe location: when the angle α (s. FIG. 4) between the polarization direction of the incoming laser beam 10 and the polarization direction of said reference beam 14 or the probe beam 16, respectively, is selected such that the intensities of reflected probe beam and reference beam—when entering the phase detection means 30—or the quarter-wave plate 32 in particular, are equal, then the advantage is reached that the subsequent control for photo-detector signal difference being a minimum value—is easy to implement. This reflects the varying reflectivity of different probe locations. Thus for example, an angle α of 30° may be also selected as best suited for a given reflectivity value of e.g. 40%.

What is claimed is:

1. A method for controlling the position of a probe relative to a fixed reference point of a probe processing apparatus said method comprising:
   coupling an optical laser apparatus to said probe processing apparatus;
   setting a position of said probe location within a predetermined converging range of a positioning laser beam coming from said optical laser apparatus;
   splitting said positioning laser beam into a probe beam and a reference beam;
   polarizing said probe beam and said reference beam in different directions with respect to each other;
   combining said reference beam with a reflected beam formed by said probe beam reflected from said probe location;
   detecting a phase difference between said reflected beam and said reference beam; and adjusting a table on said probe processing apparatus for supporting said probe to minimize said detected phase difference.

2. The method of claim 1, wherein an angle between the polarization direction of said positioning laser beam and the polarization direction of said reference beam or said probe beam is 45°.

3. The method of claim 1, wherein an angle between the polarization direction of said positioning laser beam and the polarization direction of said reference beam or said probe beam is selected such that the intensities of said reflected beam and reference beam are the same before said detecting.

4. The method of claim 1, wherein said method further includes repeating said detecting and said adjusting for a plurality of probe locations when scanning a continuous surface portion of said probe.

5. The method of claim 1, wherein said splitting is performed by a polarizing beam splitter.

6. The method of claim 1, wherein said setting further includes setting said position of said probe location within a predetermined converging range of ¼ of the wavelength of said positioning laser beam.

7. The method of claim 1, wherein said adjusting further includes moving said table on said probe processing apparatus in directions orthogonal to said probe beam.

8. An apparatus for controlling the position of a probe relative to a fixed reference point of a probe processing apparatus, said apparatus comprising:
   means for coupling an optical laser apparatus to said probe processing apparatus;
   means for setting a position of said probe location within a predetermined converging range of a positioning laser beam coming from said optical laser apparatus;
   means for splitting said positioning laser beam into a probe beam and a reference beam;
   means for polarizing said probe beam and said reference beam in different directions to each other;
   means for combining said reference beam with a reflected beam formed by said probe beam reflected from said probe location;
   means for detecting a phase difference between said reflected beam and said reference beam; and
   means for adjusting a table on said probe processing apparatus for supporting said probe to minimize said detected phase difference.

9. The apparatus of claim 8, wherein said splitting means is a polarizing beam splitter.

10. The apparatus of claim 8, wherein said detecting means includes:
    a quarter-wave-plate or a Babinet-Soleil-Compensator for modifying the polarity of said recombined beam; and
    a pair of photo detection means for sensing the respective intensity of said split beams.

11. The apparatus of claim 8, wherein an angle between the polarization direction of said positioning laser beam and the polarization direction of said reference beam or said probe beam is 45°.

12. The apparatus of claim 8, wherein an angle between the polarization direction of said positioning laser beam and the polarization direction of said reference beam or said probe beam is selected such that the intensities of said reflected beam and reference beam are the same before entering said detecting means.

13. The apparatus of claim 8, wherein said setting means further includes means for setting said position of said probe location within a predetermined converging range of ¼ of the wavelength of said positioning laser beam.

14. The apparatus of claim 8, wherein said adjusting means further includes means for moving said table on said probe processing apparatus in directions orthogonal to said probe beam.

* * * * *